United States Patent

[11] 3,588,827

[72] Inventors Frederik Johannes Van Roessel
Mahwah, N.J.;
Jan August Marcel Hofman, Emmasingel, Eindhoven, Netherlands
[21] Appl. No. 779,694
[22] Filed Nov. 29, 1968
[45] Patented June 28, 1971
[73] Assignee U.S. Philips Corporation
New York, N.Y.

[54] VARIABLE LINEAR MATRIX
10 Claims, 3 Drawing Figs.

[52] U.S. Cl. .......... 340/166, 178/5.4
[51] Int. Cl. .......... H04n 9/52
[50] Field of Search .......... 178/5.2 (A), 5.4 (ML), 5.4 (Matrix); 340/166

[56] References Cited
UNITED STATES PATENTS

| | | | |
|---|---|---|---|
| 2,877,347 | 3/1959 | Clark | 178/5.4 MAT. |
| 2,923,767 | 2/1960 | Altes | 178/5.4ML |
| 3,255,305 | 6/1966 | Chatten | 178/5.4(Mat) |
| 3,510,572 | 5/1970 | Schonfelder | 178/5.4(Mat) |

*Primary Examiner*—Ralph D. Blakeslee
*Attorney*—Frank R. Trifari

ABSTRACT: A variable linear matrix circuit for a plurality of signals, such as the three color signals in a color television camera, is comprised of a first fixed matrix, a variable matrix, and a second fixed matrix, connected in that order. The coefficients of the matrices are selected to minimize the number of variables in the variable matrix. For example, in a color television camera system having three color signals, the number of variables to be controlled in the matrix may be reduced to four.

INVENTOR.
JAN A. M. HOFMAN
FREDERIK VAN ROESSEL
BY
AGENT

INVENTOR.
JAN A.M. HOFMAN
FREDERIK VAN ROESSEL
BY
Frank R. [signature]
AGENT

INVENTOR.
JAN A.M. HOFMAN
FREDERIK VAN ROESSEL
BY
[signature]
AGENT

VARIABLE LINEAR MATRIX

This invention relates to a variable linear matrix that is particularly adaptable to the linear control of color signals in a color television camera.

A variable linear matrix is desirable in a color television camera system in order to permit control by an operator of the color signals, in order, for example, to compensate for color splitting errors in the optical system. As an example, a typical matrix for controlling color signals employs the matrix relationship:

$$\begin{vmatrix} R' \\ G' \\ B' \end{vmatrix} = \begin{vmatrix} abc \\ def \\ ghi \end{vmatrix} x \begin{vmatrix} R \\ G \\ B \end{vmatrix} \qquad (1)$$

where R, G and B are the input signals, R′, G′ and B′ are the signals modified in the matrix, and $a$—$i$ are the matrix variables that are controlled by the operator. Matrices for modifying the signals according to matrix relationship (1) are usually fabricated from conventional combinations of resistors and amplifiers.

In a matrix employing the relationship (1), nine variables must be controlled by the operator, and in a color television system the variables must be controlled in such a fashion that the sum of the coefficients of each row of the matrix must always equal unity, so that gray shades are not affected by the matrix. (Thus, for example, where $R'=aRbG-cB$. $a-b-c$ must always equal unity.) This requirement increases the problem of control of the signals in the matrix. In addition, when it is desired that the operator controlling the matrix is not located in close proximity to the variable matrix, a problem arises in the number of control cables or other transmission paths that must be provided in order to enable control of the matrix by the operator. Thus, in a color television camera system having a control unit and a remote camera unit (which includes the variable matrix) interconnected by a multiwire cable, nine additional wires in the cable must be provided in the cable for control of the variable matrix. While the control may be accomplished with a lesser number of conductors by various known multiplexing techniques, it is still undesireable to employ such a large number of control functions for the control of the matrix. In addition, it is difficult for an operator to accurately control a large number of variables.

According to the invention, these problems are overcome by providing a linear matrix which includes the effective cascade connection of a first fixed matrix, a variable matrix, and a second fixed matrix. The coefficients in the two fixed matrices are selected to minimize the variables in the variable matrix in order to obtain the desired control. It has been found that such a system is particularly advantageous in a color television camera system, since it is possible to select the matrix coefficients so that the variable coefficients have substantially no affect upon the black and white characteristics of the televised image.

In the first fixed matrix of the system according to the invention, when used in a color television camera, the three color signals R, G and B may be converted to a luminance signal M, a first color difference signal R—M, and a second color difference signal B—M, according to the matrix relationship:

$$\begin{vmatrix} M \\ R-M \\ B-M \end{vmatrix} = \begin{vmatrix} a'b'c' \\ d'e'f' \\ g'h'i' \end{vmatrix} x \begin{vmatrix} R \\ G \\ B \end{vmatrix} \qquad (2)$$

where $a'$—$i'$ are the fixed matrix coefficients (the coefficients have prime marks in order that they are not confused with the coefficients of matrix relationship (1). In this matrix the coefficients $a'$, $b'$ and $c'$ are selected so that their sum is unity and the coefficients of the other two rows are selected so that the color difference signals disappear for white picture elements. As an example, satisfactory coefficients for the matrix of matrix relationship (2) have been found to be:

$$\begin{vmatrix} +\frac{1}{3} & +\frac{1}{3} & +\frac{1}{3} \\ +\frac{2}{3} & -\frac{1}{3} & -\frac{1}{3} \\ -\frac{1}{3} & -\frac{1}{3} & +\frac{2}{3} \end{vmatrix} \qquad (3)$$

The variable matrix of the system according to the invention is designed to control the output signals of the first fixed matrix according to the following matrix relationship:

$$\begin{matrix} M' \\ (R-M)' \\ (B-M)' \end{matrix} = \begin{vmatrix} ljk \\ olm \\ onp \end{vmatrix} x \begin{vmatrix} M \\ R-M \\ B-M \end{vmatrix} \qquad (4)$$

where $j$, $k$, $l$, $m$, $n$ and $p$ are the matrix coefficients. The overall requirements that the sum of the row coefficients be equal to unity in matrix relationship (1), is satisfied in the matrix of the invention by having the first column coefficients equal to 1, 0, 0. This matrix thus has only six variables. This relationship can be further simplified by setting $j$ and $k$ equal to zero, since these coefficients primarily affect only the luminance signal and have only a minor effect on the color. Consequently, the variable matrix is preferably designed according to the matrix relationship:

$$\begin{vmatrix} M' \\ (R-M)' \\ (B-M)' \end{vmatrix} = \begin{vmatrix} 100 \\ 01m \\ 0np \end{vmatrix} \times \begin{vmatrix} M \\ R-M \\ B-M \end{vmatrix} \qquad (5)$$

The second fixed matrix is provided in order to reconvert the luminance and difference signals to modified signals R′, G′ and B′ according to the matrix relationship:

$$\begin{vmatrix} R' \\ G' \\ B' \end{vmatrix} = \begin{vmatrix} rst \\ uvw \\ xyz \end{vmatrix} \times \begin{vmatrix} M' \\ (R-M)' \\ (B-M)' \end{vmatrix} \qquad (6)$$

where $r$—$z$ are the matrix coefficients. A suitable matrix for this purpose, when the first matrix has the coefficients (3), is as follows:

$$\begin{vmatrix} +1 & +1 & 0 \\ +1 & -1 & -1 \\ +1 & 0 & +1 \end{vmatrix} \qquad (7)$$

The sets of coefficients (3) and (7) above are only examples of suitable coefficients, and it will be apparent that other values may be employed without departing from the invention. In the system according to the invention, the coefficients $l$, $m$, $n$, and $p$ do not affect the black and white aspects and gray shades of the picture, and provide full control over the colors with a minimum of variables. The arrangement is thus particularly suitable for a color television system in which a matrix in a remote camera is to be controlled by an operator at a control unit.

While the specification concludes with claims particularly pointing out and distinctly claiming the subject matter of the invention, it is believed that the invention will be better understood from the following description taken in connection with the accompanying drawings.

Figure 1:
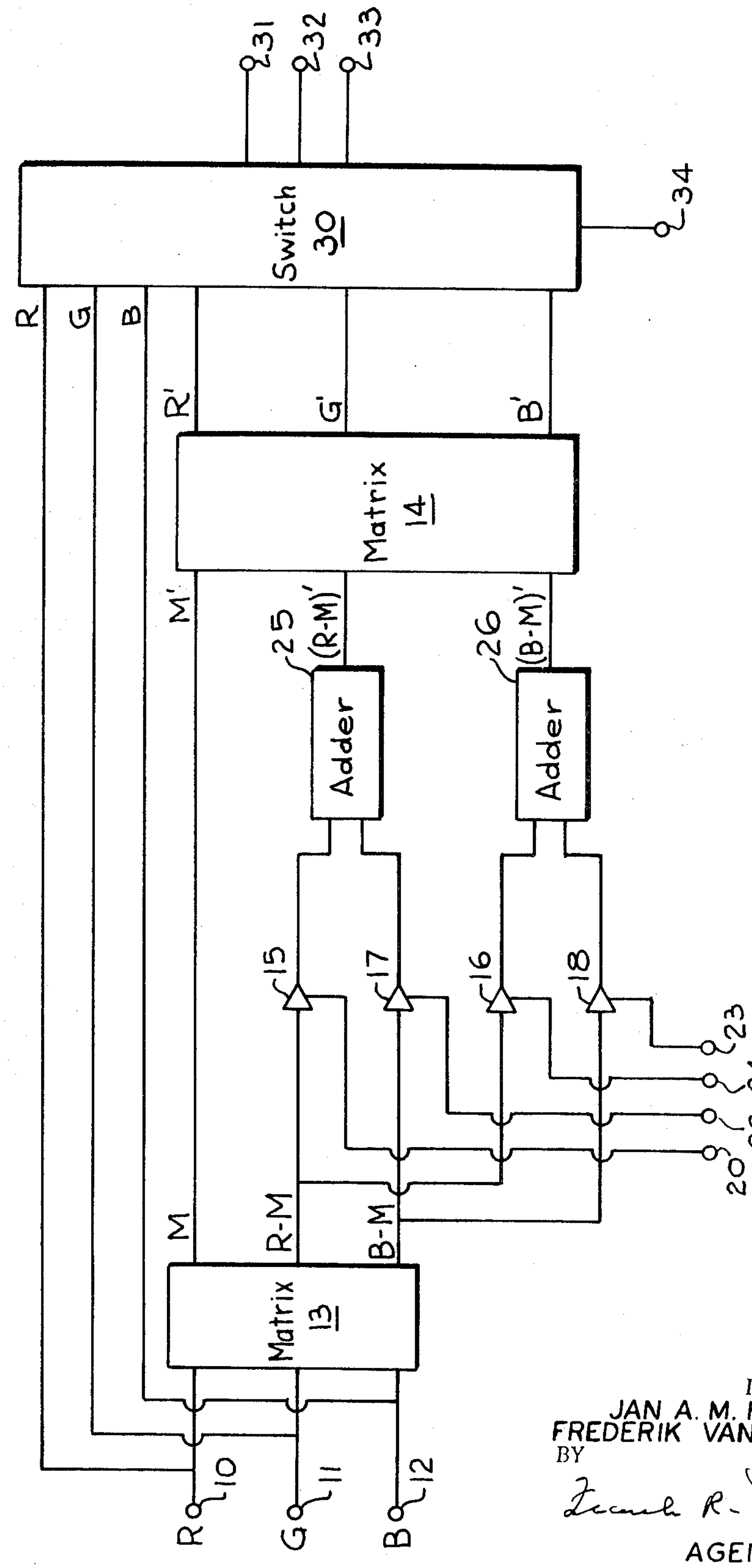
FIG. 1 is a block diagram of a variable linear matrix according to one embodiment of the invention.

Referring now to FIG. 1, therein is illustrated a simplified block diagram of a variable linear matrix according to the invention. This system is designed for a color television camera system, and has three input signals R, G and B, which are color video signals and are applied to input terminals 10, 11 and 12 respectively. These three signals are applied to a linear fixed matrix 13 which is designed according to matrix relationship (2) to provide an output luminance signal M, an output difference signal R—M, and an output difference signal B—M. Since the second two columns of the first row of the set of coefficients (5) are zero, the M signal output of matrix 13 is applied directly as the M' signal to the second fixed matrix 14. The R—M output of the matrix 13 is applied to the input of an amplifier 15, and to the input of an amplifier 16. The B—M outputs of the matrix 13 is applied to the input of an amplifier 17 and to the input of an amplifier 18. The amplifiers 15—18 are gain control amplifiers, and have gain control terminals 20, 21, 22 and 23 respectively to which gain control potentials may be applied for controlling the gains of the amplifiers. The amplifiers 15—18 are of conventional construction. The amplifiers 15—18 provide the matrix coefficients *l*, *m*, *n* and *p* of the matrix relationship (4) and the set of coefficients (5). In accordance with the matrix relationship (4), the outputs of amplifiers 15 and 17 are applied to an adder 25 to produce a signal (R—M)' for application to the matrix 14, and the outputs of amplifiers 16 and 18 are applied to an adder 26 to produce the signal (B—M)' for application to the matrix 14. The matrix 14 is a fixed matrix according to the matrix relationship (6) and produces the modified signals R', G' and B'. On some occasions it is desirable to bypass the variable linear matrix, and for this purpose a switch 30, which may be an electronic switch, is provided having output terminals 31, 32 and 33. The switch 30 has a control terminal 34, and is responsive to potentials at the terminal 34 for applying either the R', G' and B' signals for matrix 14 to the output terminals 31, 32, and 33, or to apply the R, G and B signals from terminals 10, 11 and 12 directly by way of switch 30 to the output terminals 31, 32 and 33.

Figure 2:
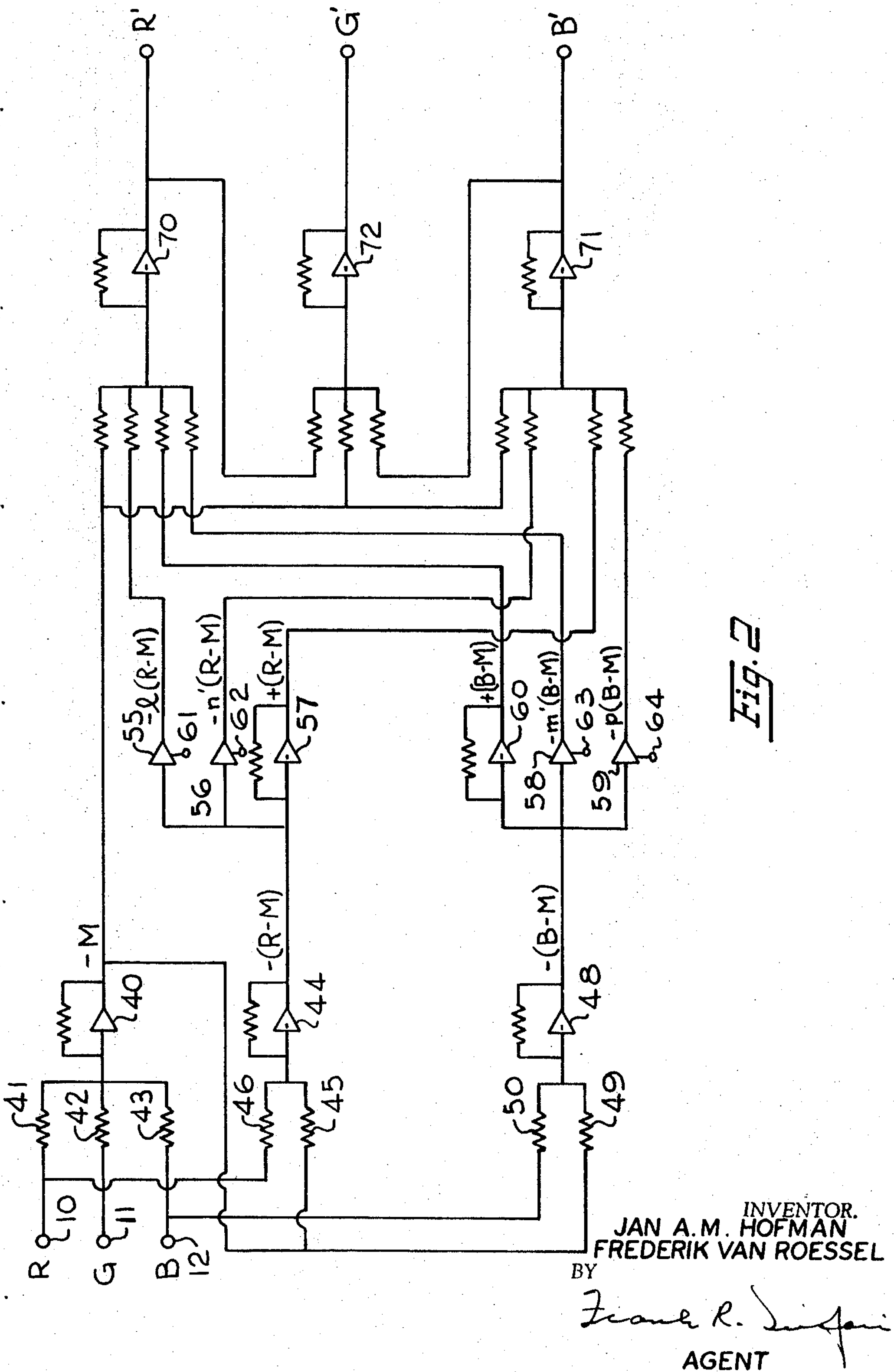
FIG. 2 is a block diagram of a preferred embodiment of the variable linear matrix according to the invention.

In order to provide complete control over the signals in the system of FIG. 1, it would be necessary that the variable gain amplifiers 15—18 have positive as well as negative amplification factors. Since this is generally not desirable, it is preferable to modify the system as shown in FIG. 2 to permit the use of amplifiers which do not have both positive and negative amplification factors. The system of FIG. 2 effectively converts the variable matrix to provide the sum of a fixed an variable matrix according to their relationship;

$$\begin{vmatrix} 100 \\ 01m \\ 0np \end{vmatrix} = \begin{vmatrix} 1 & 0 & 0 \\ 0 & 0 & -1 \\ 0 & -1 & 0 \end{vmatrix} + \begin{vmatrix} 000 \\ 01m' \\ 0n'p \end{vmatrix} \qquad (8)$$

Where *m'* and *n'* are modified coefficients. In this case, it is possible for all of the amplifiers to have the same amplification ranges, for example, one-half to 1½.

Referring now to FIG. 2, the signals R, G and B at terminals 10, 11 and 12 are applied to an operational amplifier 40 by way of matrix resistors 41, 42 and 43 to produce the luminance signal M according to matrix relationship (2). The amplifier 40 is an inverting amplifier, so its output will actually be —M. The —M signal output of amplifier 40 and the R signal from terminal 10 are applied to a second inverting operational amplifier 44 by way of matrix resistors 45 and 46 respectively, to produce the —(R—M) signal. The —M output of amplifier 40 and the B signal at terminal 12 are applied to another operational amplifier 48 by way of matrix resistors 49 and 50 respectively to produce a —(B—M) signal.

The —(R—M) signal is applied to noninverting amplifiers 55 and 56 and to an inverting amplifier 57. The —(B—M) signal is applied to noninverting amplifiers 58 and 59, and to an inverting amplifier 60. The amplifiers 55, 56, 58 and 59 are variable gained controlled amplifiers for providing the coefficients *l*, *n'*, *m'*, and *p* respectively by means of control potentials applied at their controlled terminals 61, 62, 63 and 64 respectively.

An operational amplifier 70 has its input connected to the outputs of amplifiers 40, 55, 58 and 60 in order to produce the R' signal. An operational amplifier 71 has its input connected to the output of amplifiers 40, 56, 57 and 59 to provide the output signal B'.

The outputs of the amplifiers 40, 70 and 71 are applied to an operational amplifier 72 in order to provide the G' signal. Each of the inputs to the amplifiers 70, 71 and 72 is applied by way of a series resistor (unnumbered) in order to provide the necessary signal amplitudes to satisfy matrix relationship (6).

Figure 3:
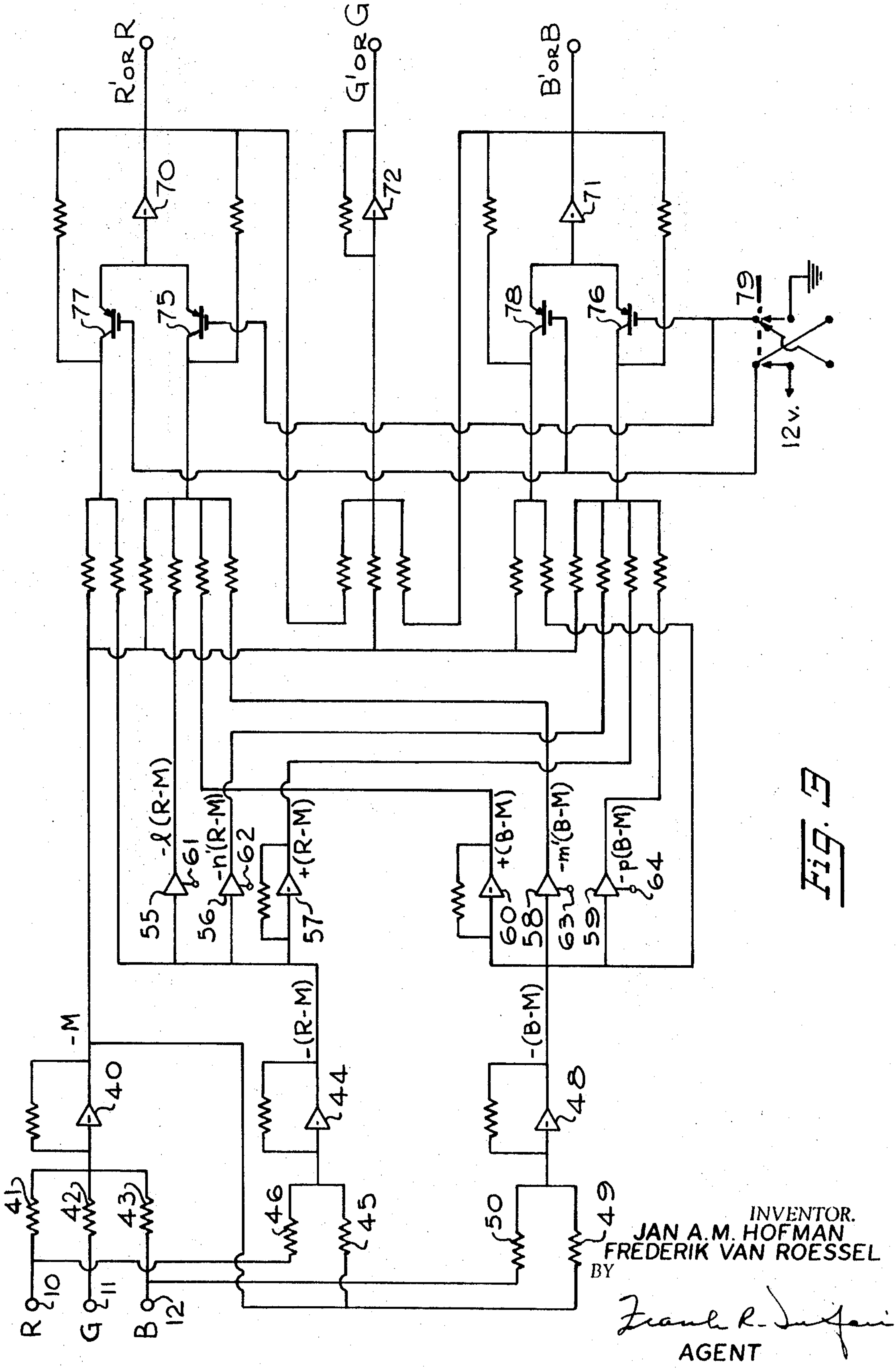
FIG. 3 is a block diagram of a modified form of the variable linear matrix of FIG. 3 and incorporating means for bypassing the variable portion of the matrix.

The arrangement of FIG. 2 is also readily adaptable to provide a switching system to enable selection of the output signals in modified or unmodified form. As shown in FIG. 3, the source-drain path of an MOSFET transistor 75 is connected between the input of amplifier 70 and the outputs of amplifiers 40, 55, 58 and 60. Similarly, an MOSFET transistor 76 is connected to the input of amplifier 72 and the outputs of amplifiers 40, 56, 57 and 59. In addition, an MOSFET transistor 77 is connected between the input of amplifier 70 and the outputs of amplifiers 40 and 44, and an MOSFET transistor 78 is connected between the input of amplifier 72 and the outputs of amplifier 40 and 48. The gates of transistors 75 and 76 are connected to one terminal of a switch 79, and the gates of transistors 77 and 78 are connected to another terminal of the switch 79. The switch 79, which is preferably an electronic switch, is connected to potential sources so that transistors 75 and 76 are conductive when transistors 77 and 78 are cut off, and vice versa. The effect of the resistance of the transistor switches on the operation of the operational amplifiers 70 and 72, is minimized by providing a separate feedback resistor from the output of each of the amplifiers 70 and 72 to the input side of each of the respective switching transistors. As a result of this, the gain of the operational amplifiers are not affected by "on" resistances of the MOSFET transistors, because they are included in the feedback loop.

In the arrangement of FIG. 3, when the transistors 75 and 76 are conductive, the system will operate in the same manner as the system of FIG. 2 to provide the R', G' and B' output signals. When the switches 77 and 78 are conductive, the variable portion of the matrix of FIG. 2 is bypassed, with the result that the R, G and B signals appear at the outputs of the amplifiers 70, 71 and 72. Series resistors are connected to each input of the operational amplifiers 70 and 72 to provide the correct signal amplitudes.

It will be understood, of course, that while the forms of the invention herein shown and described constitute the preferred embodiments of the invention, it is not intended herein to illustrate all of the equivalent forms of ramifications hereof. It will be obvious that many modifications may be made without departing from the spirit or scope of the invention, and it is aimed in the appended claims to cover all such changes as fall within the true spirit and scope of the invention.

We claim:

1. A linear matrix system comprising N input terminals, N output terminals, where N is an integer greater than unity, and a first fixed matrix, a variable matrix, and a second fixed matrix connected in that order between said input and output terminals, the sum of coefficients of one row of coefficients of said first matrix being equal to unity, the remainder of the coefficients of said first matrix, and the coefficients of said second fixed matrix being selected such that predetermined coefficients of the variable matrix are fixed.

2. A linear matrix system comprising a source of N signals, where N is an integer greater than unity, means for linearly combining said N signals in a predetermined ratio to produce a sum signal, means for combining said sum signal and one of said N signals to produce a difference signal, variable gain amplifier means connected to control the amplitude of said difference signal, and means for combining said sum and difference signals to produce output signals.

3. A linear matrix system comprising a source of N signals, where N is an integer greater than two, means for linearly combining said N signals in a predetermined ratio to produce a sum signal, means for separately combining (N−M) of said N signals with said sum signal to produce (N−M) difference signals, where M is an integer less than N, (N−M) groups of amplifiers each having (N−M) amplifier means, means applying each said difference signal to each amplifier of a separate group of amplifiers, and means connected to combine the outputs of separate amplifier means of each of said groups and said sum signal to produce N output signals.

4. The system of claim 3 wherein said means for linearly combining said N signals in a predetermined ratio comprises means for adding said N signals with coefficients having a sum equal to unity.

5. A linear matrix system comprising a source of N signals, where N is an integer greater than two, means for linearly containing said N signals in a predetermined ratio to produce a sum signal, means for separately combining (N−1) of said N signals with said sum signal to produce (N−1) difference signals, (N−1) groups of amplifiers each having (N−1) amplifier means, means applying each said difference signal to each amplifier means of a separate group of amplifiers (N−1) signal inverting means, means applying each difference signal to a separate inverting means, means for combining a separate output from each of said groups with said sum signal and an output of a separate inverting means to produce (N−1) output signals, and means for combining said (N−1) output signals and said sum signal to produce an additional output signal.

6. The system of claim 5 wherein N is equal to three, and said means for combining said N signals comprises means for combining said N signals with coefficients having a sum equal to unity.

7. The system of claim 6 wherein said means for separately combining (N−1) of said N signals with said sum signal comprises means for separately adding each said N signal with said sum signal to produce a signal that is the sum of said N signals with coefficients having a sum equal to zero.

8. The system of claim 6 wherein said means for combining a separate output from each of said groups comprises first and second operational amplifiers, and separate resistor means for applying to each of said operational amplifiers said sum signal, the output of a separate inverting means, and an output from a separate amplifier of each of said groups of amplifiers.

9. The system of claim 8 wherein said means for combining said (N−1) output signals and said sum signal to produce said additional output comprises a third operational amplifier, and means applying said sum signal and the outputs of said first and second operational amplifier to said third operational amplifier.

10. The system of claim 8 wherein said means for applying signal to said first and second operational amplifiers comprises first and second switch means respectively, said system further comprising third and fourth switch means connected to apply said sum signal and a separate one of said difference signals to said first and second operational amplifiers respectively, said switch means being interconnected so that said first and second switch means operate together in the same sense and in opposition to said third and fourth switch means, the feedback paths of said operational amplifiers comprising separate resistor means connected between the output of each operational amplifier and the input of each switch means connected thereto.

PO-1050
(5/69)

UNITED STATES PATENT OFFICE
CERTIFICATE OF CORRECTION

Patent No. 3,588,827 Dated June 28, 1971

Inventor(s) FREDERIK JOHANNES VAN ROESSEL

It is certified that error appears in the above-identified patent and that said Letters Patent are hereby corrected as shown below:

col. 1, line 28, "R' = aRbG - cB, a+b+c" should read -- R' = aR + bG + cB, a + b + c --;

col. 3, line 44, "an" should read -- and --;

col. 5, claim 5, lines 13 & 14, "containing" should read -- combining --;

Signed and sealed this 27th day of June 1972.

(SEAL)
Attest:

EDWARD M.FLETCHER,JR.
Attesting Officer

ROBERT GOTTSCHALK
Commissioner of Patents